United States Patent [19]

Dreibelbis

[11] 4,175,697
[45] Nov. 27, 1979

[54] THERMALLY ACTUATED PHASE CHANGE OPERATED CONTROL VALVE FOR USE IN AN ENERGY CONSERVATION SYSTEM

[75] Inventor: Richard C. Dreibelbis, Fair Lawn, N.J.

[73] Assignee: Emerson Electric Co. (H&H Precision Products Div.), St. Louis, Mo.

[21] Appl. No.: 829,777

[22] Filed: Sep. 1, 1977

[51] Int. Cl.² ........................................... G05D 23/00
[52] U.S. Cl. .................................. 236/93 A; 165/35; 236/100
[58] Field of Search .................... 236/93 R, 93 A, 100, 236/34.5; 165/35

[56] References Cited

U.S. PATENT DOCUMENTS

| | | | |
|---|---|---|---|
| 1,644,751 | 10/1927 | Short | 236/34.5 |
| 2,469,212 | 5/1949 | Shaw | 236/34.5 |
| 2,636,776 | 4/1953 | Vernet | 236/93 A |
| 2,719,518 | 10/1955 | Newman | 236/100 X |
| 2,776,798 | 1/1957 | Mueller et al. | 236/93 A |
| 3,019,986 | 2/1962 | Schoerner | 236/93 A X |
| 3,327,944 | 6/1967 | Viner | 236/1 C |
| 3,398,891 | 8/1968 | Horne | 236/100 X |
| 3,682,380 | 8/1972 | Aziz | 236/34.5 |
| 3,841,551 | 10/1974 | Ota | 236/100 X |
| 3,907,199 | 9/1975 | Kreger | 236/34.5 |
| 3,946,943 | 3/1976 | Hattori | 236/34.5 |
| 4,032,068 | 6/1977 | Luchtenberg et al. | 165/35 X |

FOREIGN PATENT DOCUMENTS 1043591 11/1958 Fed. Rep. of Germany ............. 236/93
1550253 9/1969 Fed. Rep. of Germany ............. 236/93

Primary Examiner—Leslie Braun
Attorney, Agent, or Firm—Daniel H. Bobis

[57] ABSTRACT

A thermally actuated phase change operated control valve has, a valve body with a bore therethrough the walls of which define a valve chamber, the valve body has a manifold assembly about the valve body and a medially disposed first port means in the valve body connects the valve chamber with the manifold assembly. Spaced second and third port means in the valve body respectively disposed on opposite sides of said first port means permit valve head means slidably disposed in said valve chamber for movement relative said first port means to direct fluid either from the valve chamber to one or the other of said second and third port means or vice versa depending on whether the control valve is operated as a diverter valve or as a mixing valve or if desired one of the spaced second or third port means can be rendered inoperative and the control valve can be operated as a thermal check valve. The valve head means is moved to and fro in the longitudinal axis of the valve chamber by a phase change power element also mounted in the valve chamber which is responsive to variations in temperature of the fluid flowing therethrough. The valve head is fixedly connected and movable with the phase change power element so that delivery of fluid to or from one or the other or both of the spaced second and third port means is accomplished as a function of the variations in temperature of the fluid passing through the valve chamber.

7 Claims, 8 Drawing Figures

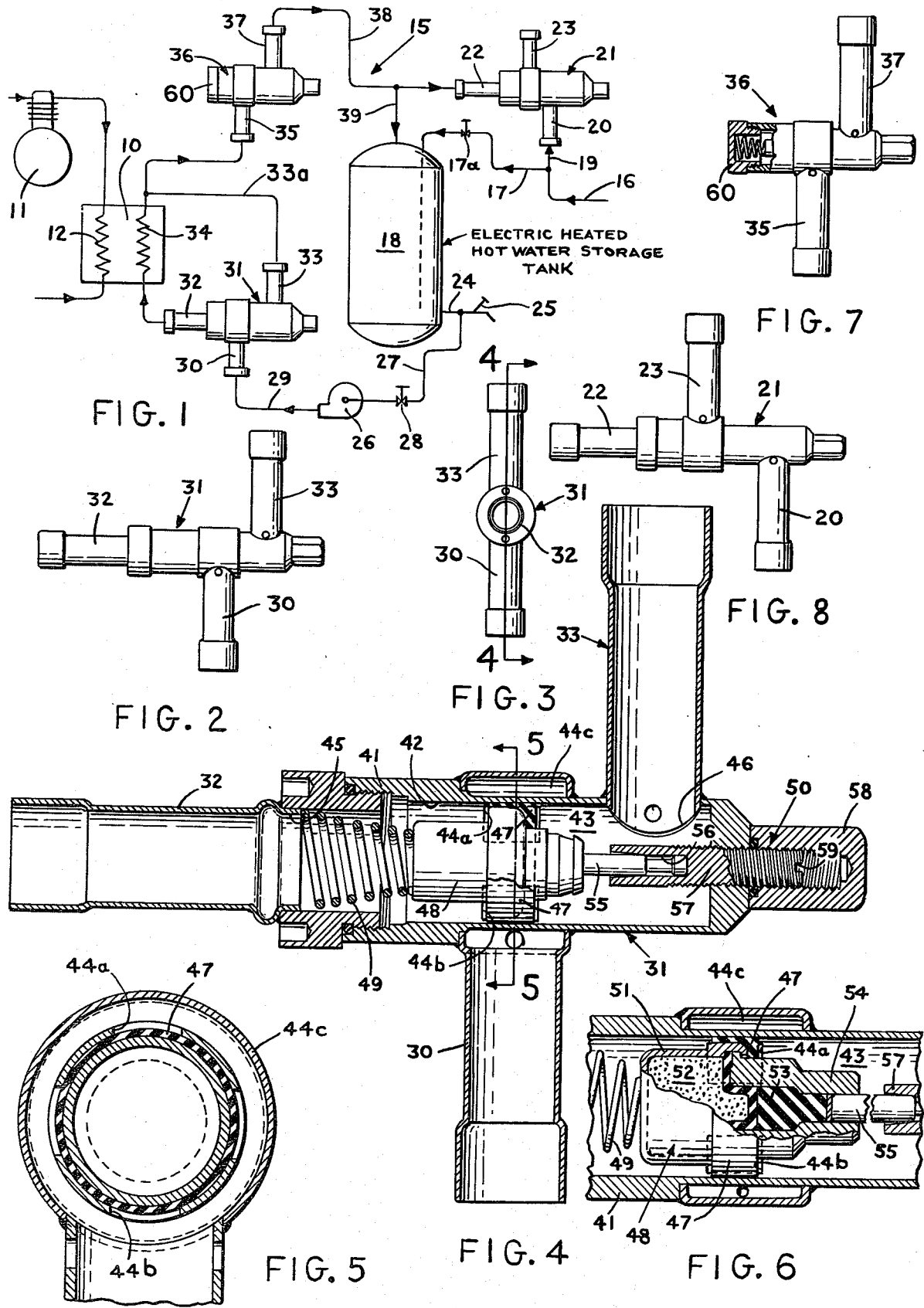

THERMALLY ACTUATED PHASE CHANGE OPERATED CONTROL VALVE FOR USE IN AN ENERGY CONSERVATION SYSTEM

BACKGROUND OF THE INVENTION

This invention relates generally to control valves utilized in energy conservation systems and more particularly to a thermally actuated phase change operated control valve for use in an energy conservation system for recovering heat from the refrigerant to water heat exchanger in a refrigeration cycle for an air conditioning system.

It is a known practice to heat water by reclaiming heat from the high temperature discharge gases of the compressor in a refrigeration cycle. In many instances this rejected heat is disposed to waste. However, the concept of reclaiming heat from the high temperature discharge gases of a compressor in a refrigeration cycle is particularly applicable to an air conditioning system where the refrigeration cycles operate at somewhat higher temperature and pressure levels because such reclaimed heat can be applied to usable purposes.

By removing heat from the high temperature discharge gases of the compressor in the refrigeration cycle or heat pump cycles of an air conditioning system before these gases are passed to a conventional condensing stage in such air conditioning systems, substantial heat recovery can be effected in a range from 4500 to 5500 BTU/hr per ton of unit capacity.

This is accomplished by inserting a suitable refrigerant-to-water heat exchanger between the compressor discharge and the inlet to the condensor in such air conditioning systems.

In effect condensing is accomplished in two steps. First, the desuperheating step where substantial quantities of heat are reclaimed and then the condensing step where the cooled gases are subjected to the conventional condensing for the refrigerant cycle.

Such an arrangement must of course be optimized by properly sizing the heat exchanger to provide the proper heat transfer capacity so that the heat is recovered without effecting the operation of the refrigeration cycle for the air conditioning system. If the heat exchanger is sized too large, the high temperature discharge gases from the compressor will condense to refrigerant liquid in the desuperheating step which will result in reduced head pressures, thus reducing capillary tube or expansion valve capacities and performance of the refrigeration cycle for the air conditioning system.

In the present invention a temperature actuated phase change operated control valve is provided for use in an improved circulating water system adapted for the recovery of waste heat by operative association with a waste heat source such as a refrigerant-to-water heat exchanger for the desuperheating of the high temperature discharge gases of the refrigerant cycle for an air conditioning system; a heat exchanger in a solar heat system; a heat exchanger in circulating grates of a fire place system; a heat exchanger in or about the stack for flue gas etc.

SUMMARY OF THE INVENTION

Thus, the present invention covers a thermally actuated phase change operated control valve having a valve body with a bore therethrough the walls of which define a valve chamber, the valve body having manifold assembly about the medial section thereof operatively associated with medially disposed port means which connects and communicates the valve chamber with the manifold assembly, and spaced port means in the valve body respectively on opposite sides of the medially disposed port means, phase change power means is slidably mounted in the valve chamber and movable to and from in the longitudinal axis thereof responsive to variations in temperature of the fluid flowing therethrough, and valve head means is fixedly connected and movable with the phase change power element relative the medially disposed port means so that delivery of fluid to or from one or the other or both of the spaced port means to or from the valve chamber means is accomplished as a function of the variations in the temperature of said fluid passing through the valve chamber.

Additionally, the present invention covers the combination for recovering heat from a refrigerant cycle of a water circulating system for a refrigerant-to-water heat exchanger in said refrigerant cycle including, an inlet for water, pump means circulating such water, a hot water storage tank, an outlet for delivering heated water at usable temperatures for any desired use, and conduit means for connecting the same to each other; with at least one thermally actuated phase change operated diverter valve connected to receive water from said hot water storage tank and to deliver the same to or to by-pass the same about said heat exchanger, at least one thermally actuated phase change operated mixing valve heating, a first port connected to the water inlet for the water circulating system, a second port connected to the water circulating system to receive heated water therefrom, and an outlet for discharging water heated to a predetermined temperature for any desired use, and at least one thermally actuated phase change operated thermal check valve connected between the heat exchanger and the hot water storage tank and to the mixing valve to deliver heated water to said mixing valve and for returning water to said hot water storage tank for maintaining the level of heated water therein.

Accordingly, it is an object of the present invention to provide an improved thermally actuated phase change operated control valve preferably applicable for use in the water circulating system for a refrigerant-to-water heat exchanger in a refrigeration system.

It is another object of the present invention to provide an improved thermally actuated phase change operated control valve adaptable for use in a refrigerant-to-water heat exchanger in a refrigeration cycle adapted to permit water in the water circulating system to be delivered to or to be diverted about the heat exchanger.

It is another object of the present invention to provide an improved thermally actuated phase change operated control valve adaptable for a water circulating system for a refrigerant-to-water heat exchanger in a refrigeration cycle adaptable to mix heated water from the system and cold water from a given source and to pass the same at usable temperatures to any desired use.

It is a still further object of the present invention to provide an improved thermally actuated phase change operated control valve adaptable for a water circulating system for the refrigerant to water heat exchanger in a refrigeration cycle to act as a thermal check valve and to permit water to pass through said control valve at a predetermined temperature.

It is another object of the present invention to combine a water circulating system for a refrigerant-towater heat exchanger in a refrigerant cycle with a plurality of thermally actuated phase change operated control valves to effect energy conservation by recovering otherwise wasted heat from said refrigeration cycle.

It is a still further object of the present invention to provide a thermally actuated phase change operated control valve having a centrally disposed manifold around the valve body thereof which coacts with rectangular shaped ports in the valve body and a valve head for regulating the area of the openings of said ports for providing improved transfer of fluid from the valve chamber in the valve body to the manifold.

Other advantages of said thermally actuated phase change operated control valve in accordance with the present invention and as utilized in an energy conservation system will become apparent from the description of the preferred forms of the present invention which follows in reference to the accompanying drawings in which:

FIG. 1 is a diagramatic sketch of one form of energy conservation system for recovering heat utilizing thermally actuated phase change operated control valves in accordance with the present invention in a water circulating system for the refrigerant-to-water heat exchanger in a refrigeration cycle.

FIG. 2 is a side view of the thermally actuated phase change operated control valve as shown in FIG. 1 which operates as a diverter valve.

FIG. 3 is a left end view of the thermally actuated phase change operated control valve shown in FIG. 2.

FIG. 4 is a vertical section taken on line 4—4 of FIG. 3, and

FIG. 5 is a vertical section taken on line 5—5 of FIG. 4,

FIG. 6 is an enlarged view of the phase change power element shown in FIG. 4 of the drawings.

FIG. 7 is a side view partially in cross-section at one end of the thermally actuated phase change operated control value shown in the water circulating system of FIG. 1 which operates as a thermal check value.

FIG. 8 is a side view of the thermally actuated phase change operated control value shown in the water circulating system of FIG. 1 which operates as a mixing value.

Referring to FIG. 1 of the drawings a refrigerant-to-water heat exchanger 10 in a refrigeration cycle for an air conditioning system is illustrated diagramatically.

Refrigerant discharge in the form of hot compressed gas from the compressor 11 of the refrigerant system is passed through line 12 in the heat exchanger 10.

Non-contacting refrigerant-to-water heat exchangers such as the heat exchanger 10 are well known to those skilled in the art and therefore are not more fully described herein.

CIRCULATING WATER SYSTEM

The circulating water system 15 for circulating water to the heat exchanger 10 receives water from any suitable source through inlet line 16 which will be under conventional supply line pressures of about 30–70 P.S.I. From line 16 the relatively cold source water can pass through delivery line 17 to the hot water storage tank 18. And through line 19 to a first inlet 20 of a thermally actuated phase change operated control valve 21. A second inlet 22 will receive heated fluid from the circulating water system 15 to permit the control valve 21 to act as a mixing valve as hereinafter described for delivering water at usable temperatures through a suitable outlet as at 23.

A conventional globe valve 17a is provided in line 17 in the event it is necessary to cut off the supply of source water to the hot water storage tank 18 for purposes of repair or maintenance.

The hot water storage tank 18 has a discharge outlet 24 which communicates with a drain 25.

Circulating pump 26 for the system has its suction line 27 connected to the discharge outlet 24 of the hot water storage tank 18. Suction line 27 will also have a conventional globe valve 28 therein in order to cut off the flow of water to the pump 26 if it becomes necessary to repair, maintain or replace this pump.

The discharge side of circulating pump 26 communicates through discharge line 29 with the inlet 30 of a second thermally actuated phase change operated control valve 31 to which the discharge line 29 is connected.

Thermally actuated phase change operated control valve 31 acts as a diverter valve in that it has spaced outlets as at 32 and 33 which are on opposite sides of the inlet 30 so that water delivered through the inlet 30 depending on the operation of the control valve 31 can be passed either through outlet 32 or outlet 33 or through both outlets 32 and 33 in any given ratio depending upon the manner in which the control valve is required to operated within the predetermined temperature range for the particular diverter valve as is more fully described hereinafter.

The outlet 32 communicates with one end of line 34 which passes through the heat exchanger 10 for heat exchange relation with the refrigerant passing through line 12 in the heat exchanger 10 and the end of line 34 remote from the outlet 32 communicates with the inlet 35 of a third thermally actuated phase change operated control valve 36 which serves as a thermally operated check valve to deliver heated water through the outlet 37 and connecting line 38 to the hot water supply inlet 22 for the mixing valve 21.

The operation of the above described circulating water system for recovering heat from the refrigeration cycle is predetermined by two factors. First the temperature at which the mixing valve 21 is to supply hot water for use generally in a range from 120° F. to 160° F., and second the temperature setting for the hot water in the hot water storage tank 18 of about 180° F. or higher to obtain maximum system efficiency.

In the operation of the circulating water system even though each of the respective thermally actuated phase change operated control valves 21, 31 and 36 have substantially similar structure as is hereinafter more fully described they each perform a different function in the operation of this system.

Control valve 31 is in the closed loop between the hot water storage tank 18 and the refrigerant to water heat exchanger 10. The function of control valve 31 is to sense the temperature of the water delivered by the circulating pump 26 from the bottom of the hot water storage tank 18. If this water is cold the control valve 31 will operate to pass the water from the inlet line 30 to the outlet line 32 connected in turn to the line 34 so that this cold water can pass through the refrigerant to water heat exchanger 10 and thereby pick up useful heat. However, the control valve 31 is so set that if the water delivered by the circulating pump 26 from the bottom of the hot water storage tank 18 is above the predetermined setting of the control valve 31 generally in the order of 165° F. and therefore requires no further heating, the water will pass from the inlet 30 to the outlet 33 so that it by-passes the heat exchanger 10 and since the water is at a useable temperature above 140° F. the control valve 36 will permit the water to pass to the mixing valve 21 or return to the hot water storage tank 18 through connecting line 39.

The control valve 21 is connected into the system and acts to automatically proportion the mixture of cold water delivered through cold water inlet port 20 and heated water inlet port 22 so that the water delivered through the outlet port 23 will be at the pre-established or predetermined outlet temperature for the heated water to be supplied for use.

The structure and operation of the control valves 21, 31 and 36 is best understood by reference to FIG. 4 which is a cross-section taken through control valve 31.

Thus control valve 31 which operates as a diverting valve includes, a valve body 41 having, a bore 42 the walls of which define a valve chamber 43. The valve body is provided with spaced ports as at 44a and 44b which communicate with a manifold 44c in turn for this form of the control valve connected to the inlet 30 to provide means for delivering water from the circulating system to the valve chamber 43. On opposite sides of the ports 44a and 44b, ports are provided as at 45 and 46 which communicate respectively with the spaced outlets 32 and 33 connected to the valve body 41. The ports 44a and 44b are rectangular in shape and provide increased water flow between the chamber 43 and the manifold 44c on movement of valve head 47 relative these ports to control and regulate the flow of water from the valve chamber 43 to either or both of the outlet ports 45 and 46.

Valve head 47 is slidably disposed in bore 42 and is mounted on and movable with and moved by a phase change power element 48 which is disposed in the longitudinal axis of the valve chamber 43. Phase change power element 48 is held in a calibrated initial position between a resilient member 49 and a calibrating assembly generally designated 50 disposed in the valve body at opposite ends of the valve chamber and on opposite sides of the phase change power element 48, as is shown in FIG. 4 of the drawings.

The resilient member 49 at all times urges the phase change power element 48 into firm engagement with the calibration assembly 50 but due to the resilient character of the resilient member 49 permits the phase change power element to expand and contract with variations in temperature of the water being circulated from the circulating system 15 through the control valve 31.

Since the valve head 47 is fixedly connected about the phase change power element 48 it will be moved therewith and will change position to vary the area of the openings respectively of the inlet ports 44a and 44b so as to deliver more or less fluid to one or the other of the outlet ports 45 or 46.

Further as shown at FIGS. 4 and 6 of the drawings, the valve head 47 is sized relative the inlet ports 44a and 44b so that the width thereof is less than the width of the rectangular openings defining the inlet ports 44a and 44b. This construction is necessary because the operator for moving the valve head 47 is the phase change power element 48 and this sizing of the valve head will insure that there will always be fluid flowing through the fluid flow chamber 43 in each given valve the temperature of which will at all times actuate the phase change power element and thus prevent a dangerous build up of pressure in any of the respective valves illustrated.

A phase change power element such as element 48 is a device which can be purchased on the open market. This device includes, a cup shaped housing 51 for holding a phase change material 52, a diaphragm 53 which closes the cup shaped housing and a closure member 54 which seals the diaphragm assembly 53 in assembled position. The diaphragm assembly 53 is operatively connected to a push rod 55 which extends through the closure member all of which is shown in FIG. 4 of the drawings.

In the construction shown in FIG. 4, the push rod 55 is set in a bore 56 of the calibrating screw 57 and is maintained in engagement with the calibrating screw 57 by means of the resilient member 49. By removing the cap 58 and inserting a screw driver in the slot 59 on the exterior portion of the calibrating screw 57 the phase change power element 48 and the valve head 57 can be moved in the longitudinal axis of the valve chamber 43 so that the same is positioned as desired relative the inlet ports 44a and 44b.

As the temperature of the water entering the valve chamber 43 varies the phase change material 52 will expand or contract and the diaphragm member 53 which is mounted on the push rod 55 will cause the phase change power element to change its position proportionally to said expansion or contraction of the phase change material.

In operation when the water is below a predetermined temperature of about 155° F. in the setting range for the phase change material 52, the phase change material will contract and the resilient element 49 will cause the phase change power element 48 to move so that all of the water from the inlet ports 44a and 44b will pass through the outlet 32 to line 34 in the heat exchanger 10. However if the water is above a temperature of about 165° F. within the setting range for the phase change material 52, the phase change material will expand and the phase change power element 48 will be removed against the resilient element 49 so that all of the water from the inlet ports 44a and 44b will be caused to pass through the outlet 33 to by-pass the heat exchanger 10. At positions between these temperature limits, a portion of water will by-pass the heat exchanger 10 and a portion will pass to the heat exchanger 10.

FIG. 7 shows that the temperature actuated phase change operated thermal check valve 36 differs from control valve 31 only to the extent that one of the ports normally communicating with the valve chamber 43 is closed off by a threaded closure member 60.

Thermal check valve 36 is otherwise identical in structure to control valve 31 and like parts accordingly have like character numerals.

In this form of the control valve however because there is only a single inlet 35 and a single outlet 37 the phase change power element 48 will be selected with a phase change material which will cause the inlet ports 44a and 44b to open when the temperature of the water flowing into the valve chamber 43 of control valve 36 exceeds a predetermined minimum temperature for example 150° F. within the settable range for the phase change power element. When the inlet ports 44a and 44b are so opened water will pass from the inlet 35 to the outlet 37 and thence by a line 38 to either the mixing valve 21 or the hot water storage tank 18. Thermal check valve 36 insures that even though no heat is available from the heat source namely heat exchanger 10, and the water entering control valve 31 is cold that no water can enter line 38 feeding the hot water storage tank 18 and/or the mixing valve 21.

An intentional bleed, not showing, can be provided across the valve head 47 to insure better valve response during closing and/or the approach of the valve head 47 to its closed position relative the associated valve ports in accordance with the expansion and contraction of the phase change material therein so as to pass through the ports 44a and 44b a total volume of water to the manifold 44c at the desired or useable temperature for delivery to the desired use through the outlet 23.

Thus a single valve construction has been disclosed which is versatile in operation as a function of the manner in which the inlets and outlets to the valve are connected and the ports in the valve are operated. This is illustrated in that valve 31 operates as a diverter valve, valve 36 as a thermal check valve, and valve 21 as a mixing valve as will now be described with reference to the operation of the water circulating system wherein the operation of this valve provides for energy conservation in that heat which has heretofore been wasted is now recovered or reclaimed and usefully applied.

OPERATION

In operation, the glove valves 17a and 28 are moved to open position and the circulating pump 26 is placed into operation.

The system is characterized by a closed loop which acts to maintain the temperature of the water in the hot water storage tank at temperatures as high as 180° F. Connected to the closed loop circuit is the mixing valve which mixes a portion of the heated water from the closed loop with a portion of the cold source water to provide the required water at useable temperatures for the desired application or use.

The centrifugal pump 26 acts to circulate and mix water in the closed loop.

Thus referring to FIG. 1 the circulating pump 28 draws water from the bottom of the hot water storage tank 18 and discharges the same through line 29 to the control valve 31.

If the temperature of the water is below a predetermined temperature of 155° F. within the settable range for the phase change material in control valve 31 all of the water will be passed through port 45, outlet 32 and line 34 in the heat exchanger 10. In heat exchanger 10 the water will flow in non-contacting heat exchange relation with the hot refrigerant gas passing through line 12 and will absorb a portion of the available heat from the super heated gas refrigerant.

The water in line 34 then flows to the inlet 35 of thermal check valve 36 and if the temperature of the water exceeds 150° F. within the settable range of the phase change material it will pass from the inlet 35 through ports 44a and 44b and manifold 44c on the check valve 36 to the outlet 37. The outlet in turn will deliver the heated water through line 38 and 39 back to the storage tank 18 if the mixing valve 21 is not drawing water from the closed loop system for mixture with sourced water as above described.

If however the mixing valve 21 is drawing water from the closed loop for mixture with closed source water, then a portion of the heated water from line 38 and a portion of the heated water from the hot water storage tank 18 will pass directly to the inlet 22 of the control valve 21 as is clearly shown in FIG. 1 of the drawings.

If the water delivered or discharged by pump 26 through line 29 to the inlet 30 of control valve 31 is above a predetermined temperature of say 165° F. then the water will be diverted so as to flow through the outlet 33 through line 33a to a point on line 34 downstream from the point where it exits from the heat exchanger 10 and it passes through line 34 to the inlet 35 of the thermal check valve 36. In thermal check valve 36, if the temperature is still sufficiently high, water will pass through the ports 44a and 44b into the valve chamber 43 of the thermal check valve 36 and thence to the outlet 37 for return through lines 38 and 39 to the hot water storage tank 18 and/or to the mixing valve 21 of the mixing valve is delivering water for the desired application or use.

Those skilled in the art will readily understand that the superheat from the compressed gas of a refrigeration cycle is only representative of one type of wasted heat that can be recovered. Therefore, it will be understood that the circulating water system disclosed and the thermally actuated phase change operated control valves utilized in such system for energy conservation in accordance with the present invention can be operatively associated with other wasted heat sources without departing from the scope of the present invention.

Such other sources of "free" or wasted heat will include solar energy, heat from fireplaces, heat from the chimney stack of a heating system, flue gases from ovens, etc. Non-contacting heat exchangers such as the refrigerant-to-gas heat exchanger 10 can be added to such sources of wasted heat to enable the system in accordance with the present invention to operate in the same manner as has been hereinabove described.

It will be understood that the invention is not to be limited to the specific construction or arrangement of parts shown but that they may be widely modified within the invention defined by the claims.

What is claimed is:

1. A thermally actuated phase change operated valve for controlling flow of fluid comprising:
   a. valve body means having walls therein defining a main fluid flow chamber,
   b. said valve body means having medially disposed openings through the walls thereof defining first port means, manifold means about said wall means defining a collecting chamber, said first port means connecting said main fluid flow chamber with said collecting chamber,
   c. conduit means connected to said valve body means for passing fluid to and from said collecting chamber,
   d. said valve body means having second port means and a third port means through the walls thereof respectively disposed on opposite sides of said first port means,
   e. at least one other conduit connected to said valve body means for communication with said second port means for passing fluid to and from said main fluid flow chamber,
   f. phase change power means freely disposed for sliding movement in said main fluid flow chamber and including, valve head means fixedly connected about the periphery of the medial section of the phase change power means and moveable therewith from an initial calibrated setting relative said first port means, g. said valve head means having a width less than the width of the openings for said first port means to insure at least a minimum flow of fluid through said main fluid flow chamber at all times and moveable to vary the respective areas of flow through the openings for said first port means to the respective opposite sides of the main fluid flow chamber relative to the valve head means, and h. said phase change power means operated responsive to variations in temperature of the fluid in said main fluid f flow chamber to move the valve head means to and fro proportional to said variations in temperature for varying the area of the respective openings of the first port means.

2. In a thermally actuated phase change operated control valve as claimed in claim 1 wherein; said medially disposed first port means is rectangular in shape to provide an improved rate of flow during opening of the first port means.

3. In a thermally actuated phase change operated control valve as claimed in claim 1 wherein;

a. the conduit means serves as an inlet for fluid delivered to said first port means of the control valve, and b. said valve head means acts to deliver fluid from said main fluid flow chamber to at least the second port means.

4. In a thermally actuated phase change operated control valve as claimed in claim 1 wherein;

a. the phase change power element is adjustably mounted in the valve body means between a resilient member and a calibrating assembly disposed respectively in said valve body means on opposite sides of said phase change power element, and b. said calibrating assembly includes a theaded member extending through the walls of the valve body means to the exterior thereof.

5. In a thermally actuated phase change operated control valve for controlling flow of fluid comprising:

a. valve body means having wall means therein defining a main fluid flow chamber, b. said valve body means having medially disposed openings through the walls thereof defining first port means, manifold means about said wall means defining a collecting chamber, and said first port means connecting said main fluid flow chamber with said collecting chamber, c. first conduit means connected to said valve body means for passing fluid to and from said collecting chamber, d. said valve body means having a second port means and a third port means through the walls thereof respectively disposed on opposite sides of said first port means, e. second conduit means connected to said valve body means for communication with said second port means for passing fluid to and from said main fluid flow chamber, f. third conduit means connected to said valve body means for communication with said third port means for passing fluid to and from said main fluid flow chamber, g. phase change power means freely disposed for sliding movement in said main fluid flow chamber and including, valve head means fixedly connected about the periphery of the medial section of the phase change power means and moveable therewith from an initial calibrated setting relative said first port means, h. said valve head means having a width less than the width of the openings for said first port means to insure at least a minimum flow of fluid through said main fluid flow chamber at all times and moveable to vary the respective areas of flow through the openings for said first port means to the respective opposite sides of the main fluid flow chamber relative the valve head means, and i. said phase change power means operated responsive to variations in temperature of the fluid in said main fluid flow chamber to move the valve head means to and fro proportional to said variations in temperature for varying the area of the respective openings of the first port means.

6. In a thermally actuated phase change operated control valve as claimed in claim 5 wherein;

a. said first conduit delivers fluid to said first port means, b. said valve head means diverts the flow of fluid to the second conduit means and third conduit means in a ratio as a function of the variations in temperature of the fluid in said main fluid flow chamber.

7. In a thermally actuated phase change operated control valve as claimed in claim 5 wherein;

a. said second conduit means delivers cold fluid to said main fluid flow chamber, b. said third conduit means deliver heated fluid to said main fluid flow chamber, c. said valve heads means mixes a ratio of heated fluid and cold fluid to deliver fluid at a predetermined temperature through said first port means to the collecting chamber, d. said first conduit means is adopted to pass said fluid from the collecting chamber to any suitable point of use.

* * * * *